(12) United States Patent
Donegan et al.

(10) Patent No.: US 9,295,235 B2
(45) Date of Patent: *Mar. 29, 2016

(54) BIRD FEEDER WITH ROTATING PERCH

(71) Applicant: Classic Brands, LLC, Denver, CO (US)

(72) Inventors: Robert Donegan, Denver, CO (US);
Bryan Krueger, Denver, CO (US)

(73) Assignee: Classic Brands, LLC, Denver, CO (US)

( * ) Notice: Subject to any disclaimer, the term of this patent is extended or adjusted under 35 U.S.C. 154(b) by 2 days.

This patent is subject to a terminal disclaimer.

(21) Appl. No.: 14/486,795

(22) Filed: Sep. 15, 2014

(65) Prior Publication Data

US 2015/0000603 A1 Jan. 1, 2015

Related U.S. Application Data

(63) Continuation of application No. 13/855,565, filed on Apr. 2, 2013, now Pat. No. 8,833,302.

(60) Provisional application No. 61/619,414, filed on Apr. 2, 2012.

(51) Int. Cl.
*A01K 31/12* (2006.01)
*A01K 39/01* (2006.01)
*A01K 39/012* (2006.01)

(52) U.S. Cl.
CPC ............... *A01K 39/01* (2013.01); *A01K 39/012* (2013.01)

(58) Field of Classification Search
CPC ............................... A01K 31/12; A01K 39/01
USPC ......... 119/57.8, 52.3, 57.9, 51.01, 52.2, 52.4, 119/59, 63
See application file for complete search history.

(56) References Cited

U.S. PATENT DOCUMENTS

| | | | | | |
|---|---|---|---|---|---|
| 4,188,913 | A * | 2/1980 | Earl et al. | ...................... | 119/57.9 |
| 4,223,637 | A * | 9/1980 | Keefe | ........................... | 119/52.2 |
| 5,105,765 | A * | 4/1992 | Loken | ......................... | 119/57.9 |
| 5,947,054 | A * | 9/1999 | Liethen | ........................ | 119/57.9 |
| 6,119,627 | A * | 9/2000 | Banyas et al. | ................. | 119/57.9 |
| 6,415,737 | B2 * | 7/2002 | Banyas et al. | ................. | 119/57.9 |
| 7,448,346 | B1 * | 11/2008 | Stone et al. | ................... | 119/52.3 |
| 7,739,982 | B2 * | 6/2010 | Cote | ............................ | 119/57.9 |
| 2003/0136347 | A1 * | 7/2003 | Fasino | ......................... | 119/57.9 |
| 2004/0231606 | A1 * | 11/2004 | Nock | ........................... | 119/57.8 |
| 2005/0263085 | A1 * | 12/2005 | Rich | ............................ | 119/57.8 |
| 2006/0225658 | A1 * | 10/2006 | Baynard | ...................... | 119/57.8 |
| 2007/0034160 | A1 * | 2/2007 | Nock | ........................... | 119/57.8 |
| 2007/0163506 | A1 * | 7/2007 | Bloedorn | ..................... | 119/52.2 |
| 2007/0227454 | A1 * | 10/2007 | Fahey | .......................... | 119/57.8 |
| 2009/0223456 | A1 * | 9/2009 | Hunter et al. | ................... | 119/53 |
| 2010/0089330 | A1 * | 4/2010 | McMullen | .................. | 119/52.3 |
| 2012/0234249 | A1 * | 9/2012 | Gaze | ........................... | 119/57.8 |

* cited by examiner

*Primary Examiner* — Trinh Nguyen

(74) *Attorney, Agent, or Firm* — Polsinelli PC

(57) ABSTRACT

Implementations described and claimed herein provide apparatuses and methods for providing different perch positions for feeding birds. In one implementation, a bird feeder includes a reservoir having a wall defining an interior. The wall has a wall opening to provide access to the interior. A port is mounted on the wall relative to the wall opening. The port includes a protruding portion extending from a surface. The protruding portion defines an opening providing access to the wall opening. A perch has a projecting portion extending from a surface covering the opening defined by the protruding portion. The surface has one or more holes providing access to the opening. The perch is connected to the port such that the projecting portion is moveable to a plurality of positions relative to an axis line extending through a center of the opening defined by the protruding portion.

15 Claims, 13 Drawing Sheets

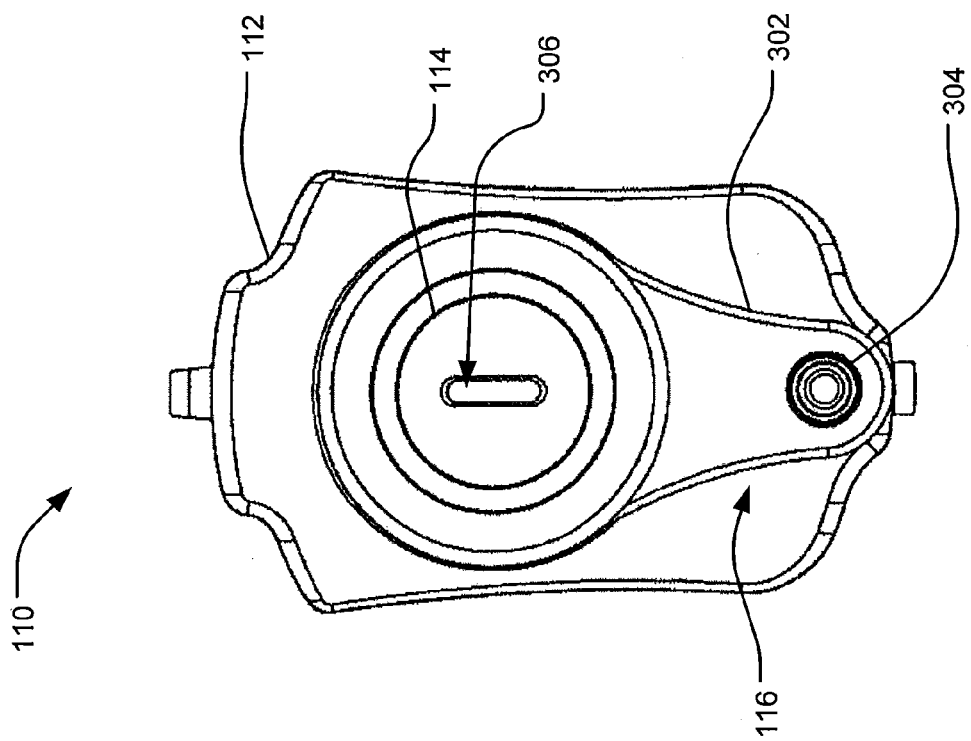
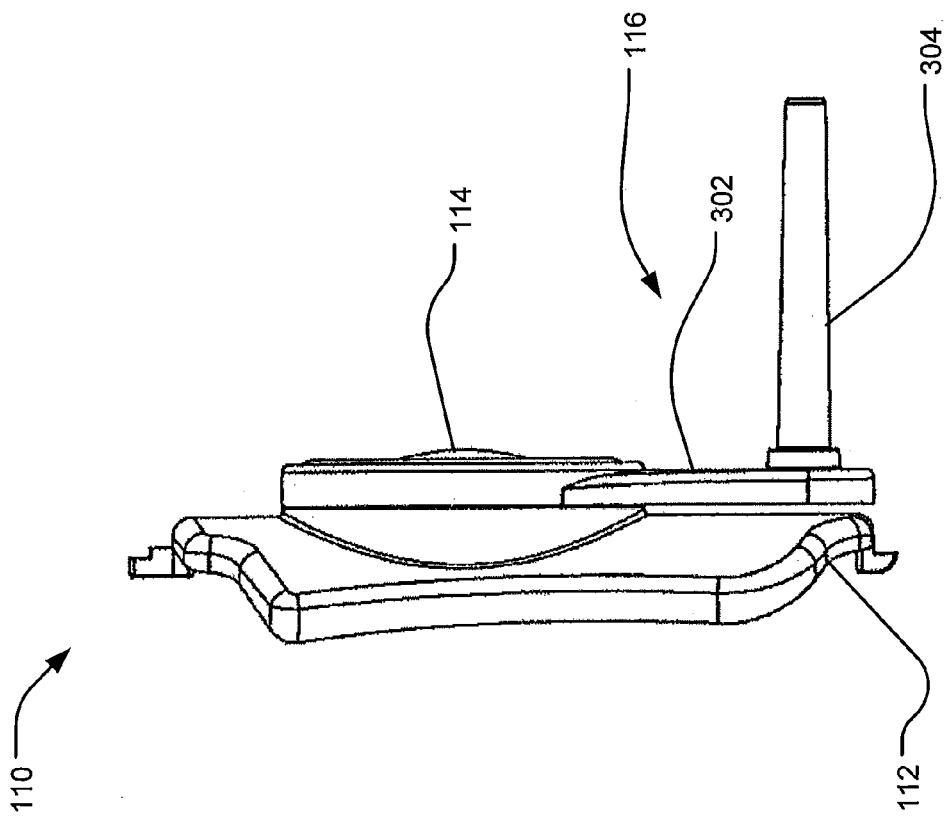
FIG. 8B
FIG. 8A

BIRD FEEDER WITH ROTATING PERCH

CROSS-REFERENCE TO RELATED APPLICATIONS

The present application is a continuation of U.S. patent application Ser. No. 13/855,565 entitled "Bird Feeder with a Rotating Perch" and filed on Apr. 2, 2013, which claims priority under 35 U.S.C. §119(e) to U.S. Provisional Patent Application No. 61/619,414, entitled "Goldfinch Feeder" and filed on Apr. 2, 2012. Each of these applications is specifically incorporated by reference herein in its entirety.

BACKGROUND

Many bird feeders offer a number of fixed perches with corresponding feeding openings positioned relative to each of the perches. However, such bird feeders fail to consider that birds, particularly different species of birds, feed in a variety of positions. For example, the goldfinch often feeds upside down, while the house finch is unable to feed upside down. Accordingly, if an owner desires to attract goldfinches and exclude house finches and other birds, the owner generally must purchase a bird feeder having feeding openings positioned below each perch. However, if the owner changes his mind and wishes to attract house finches and other birds in addition to goldfinches, the owner must generally purchase another bird feeder entirely with feeding openings placed above each perch. Accordingly, many bird feeders fail to take into consideration the variety of positions in which different birds, particularly the goldfinch and house finch, feed.

It is with these observations in mind, among others, that various aspects of the present disclosure were conceived and developed.

BRIEF SUMMARY

Implementations described and claimed herein address the foregoing problems by providing apparatuses and methods for providing different perch positions for feeding birds. In one implementation, a bird feeder includes a reservoir having a wall defining an interior. The wall has a wall opening to provide access to the interior. A port is mounted on the wall relative to the wall opening. The port includes a protruding portion extending from a surface. The protruding portion defines an opening providing access to the wall opening. A perch has a projecting portion extending from a surface covering the opening defined by the protruding portion. The surface has one or more holes providing access to the opening. The perch is connected to the port such that the projecting portion is moveable to a plurality of positions relative to an axis line extending through a center of the opening defined by the protruding portion.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

FIG. 8A illustrates a side view of the example feeding station of FIG. 3.

FIG. 8B illustrates a front view of the example feeding station of FIG. 3.

DETAILED DESCRIPTION

Aspects of the present disclosure involve apparatuses and methods for providing different perch positions for feeding birds. In one particular aspect, a bird feeder with a rotating perch is provided. The bird feeder includes a reservoir configured to hold bird food. The reservoir has a wall and at least one opening in the wall providing access to the bird food. A feeding station is configured to be mounted on the wall relative to the opening. The feeding station includes a port through which a bird may access the bird food in the reservoir and a perch from which the bird may access the port. The perch is connected to the port such that the perch may be rotated to a plurality of positions relative to the port. The different positions allow birds that feed from different positions to access the bird food and further allow the owner to choose what birds to attract.

Figure 1:
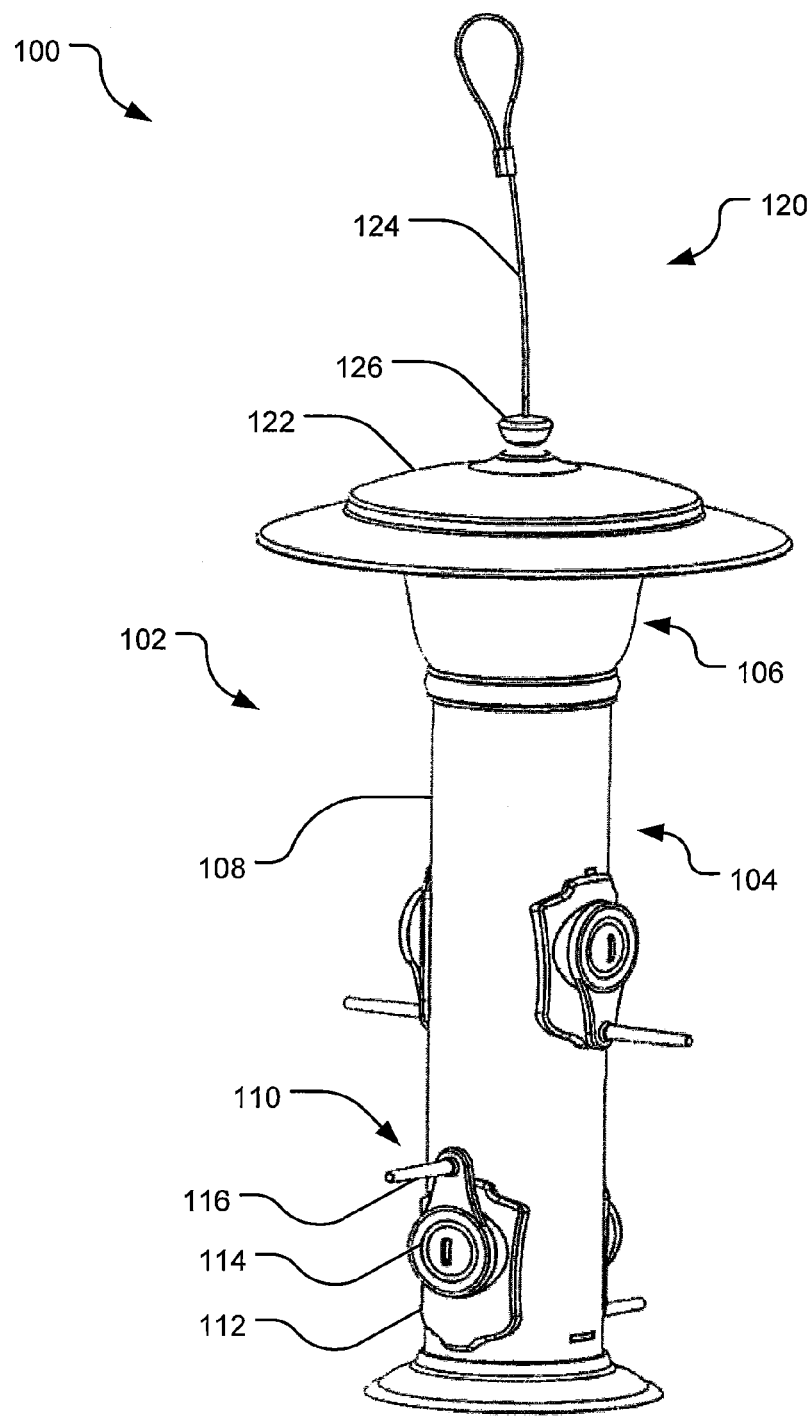
FIG. 1 illustrates a perspective view of an example bird feeder having a rotational perch.

As can be understood from FIG. 1, which shows a perspective view of an example bird feeder 100, a reservoir 102 is configured to hold bird food, which may be a variety of different bird seeds of different sizes. In one implementation, the reservoir 102 includes a tube 104 and a mouth 106. The tube 104 has a generally cylindrical shape and the mouth 106 is tapered to accept bird food with minimal spillage. In one implementation, the mouth 106 and the tube 104 may be formed from a single piece. Stated differently, the tube 104 and the mouth 106 may be substantially one continuous shape. For example, the tube 104 and the mouth 106 may form a single cylindrical shape. Further, the tube 104 and/or the mouth 116 may form other shapes, including but not limited to, rectangular, conical, triangular, elliptical, hexagonal, hemispherical, hemiellipsoidal, cubical, pyramidal, and cylindrical, are contemplated. The tube 104 and/or the mouth 106 may additionally include one or more surfaces (e.g., the wall 108) that may be planar, curved, contoured, angled, and/or the like.

In one implementation, the tube 104 includes the wall 108 having at least one opening providing access to the bird food. The bird feeder 100 includes a feeding station 110 configured to be mounted on the wall 108 relative to the opening. The feeding station 110 includes a perch 116 from which a bird may access the bird food via the opening in the wall 108. In one implementation, the perch 116 may be directly connected to the wall 108 in a manner permitting the perch 116 to be moved (e.g., rotated, slid, turned, etc.) to a plurality of positions around the opening in the wall 108 depending on the type of bird the owner desires to attract. In another implementation, the perch 116 is connected to the wall 108 using a port 112 or similar feature. The port 112 permits a bird to access the bird food in the reservoir 102, and the perch 116 permits the bird to access the port 112. The perch 116 may be connected to the port 112 such that the perch 116 may be moved to a plurality of positions around the port 112.

In some implementations, the feeding station 110 further includes a port plug 114. The port 112 may be configured to receive the port plug 114 to mount the perch 116 on the bird feeder 100 such that the perch 116 may be moved to various positions. In one implementation, the port 112 and the port plug 114 are stationary as the perch 116 moves. In another implementation, the port plug 114 and/or the port 112 move with the perch 116 as the perch 116 is positioned.

The mouth 106 is configured to receive a lid assembly 120 to close or occlude the reservoir 102. In one implementation, the lid assembly 120 includes a lid 122 which extends past the edge of the mouth 106. The lid 122 is held to the mouth 106 by a cable 124, which is attached to the reservoir 102 and passes through the lid 122 at a knob 126. In one implementation, the knob 126 is located at the substantial center of the lid 122. In another implementation, the knob 126 is positioned near a side of the lid 122. The lid assembly 120 may include a plurality of knobs 126, for example, positioned generally opposite another one of the knobs 126. The cable 124 extends upwardly to attach to an item, including, without limitation, a tree limb or a hook.

The bird feeder may include any number of feeding stations, including the feeding station 110, positioned relative to openings in the wall 108. For example, as shown in FIG. 1, the bird feeder 100 may include four feeding stations to accommodate more birds.

Figure 2:
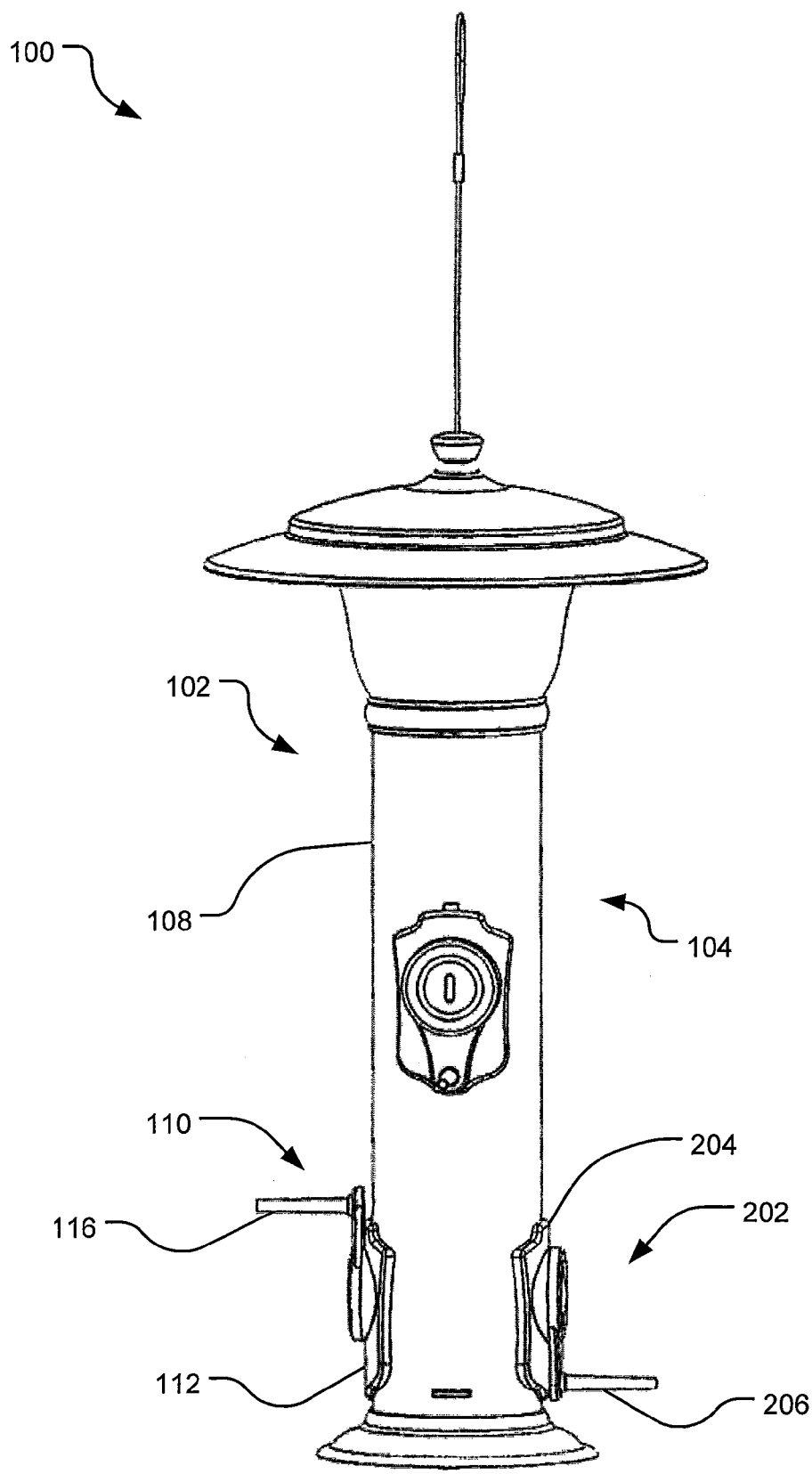
FIG. 2 illustrates another perspective view of the example bird feeder of FIG. 1.

Turning to FIG. 2, the bird feeder 100 may include a second feeding station 202 mounted on the wall 108 generally opposite the feeding station 110. The second feeding station 202 includes a port 204 and a perch 206, as described herein. As can be understood from FIG. 2, the perches 116 and 206 may be moved to a plurality of positions relative to the ports 112 and 204, respectively. For example, the perch 116 is positioned near the top of the port 112, and the perch 206 is positioned near the bottom of the port 204. In one implementation, the ports 112 and 204 are stationary, and the positions of the ports 112 and 204 do not change as the perches 116 and 206 are moved.

If an owner desires to attract goldfinches and exclude house finches and other birds, a perch of each feeding station of the bird feeder 100 are moved to the position of the perch 116, as shown in FIG. 2. Specifically, each of the perches is moved to a position near the top of the ports (e.g., the position of the perch 116 shown in FIG. 2). However, if the owner desires to attract house finches and other birds, the perches may be moved to a position near the bottom of the ports (e.g., the position of the perch 206 shown in FIG. 2). The owner may also position the perches such that a first portion of the perches attract goldfinches and exclude other birds, including house finches, and a second portion of the perches attract house finches and other birds in addition to gold finches.

Figure 3:
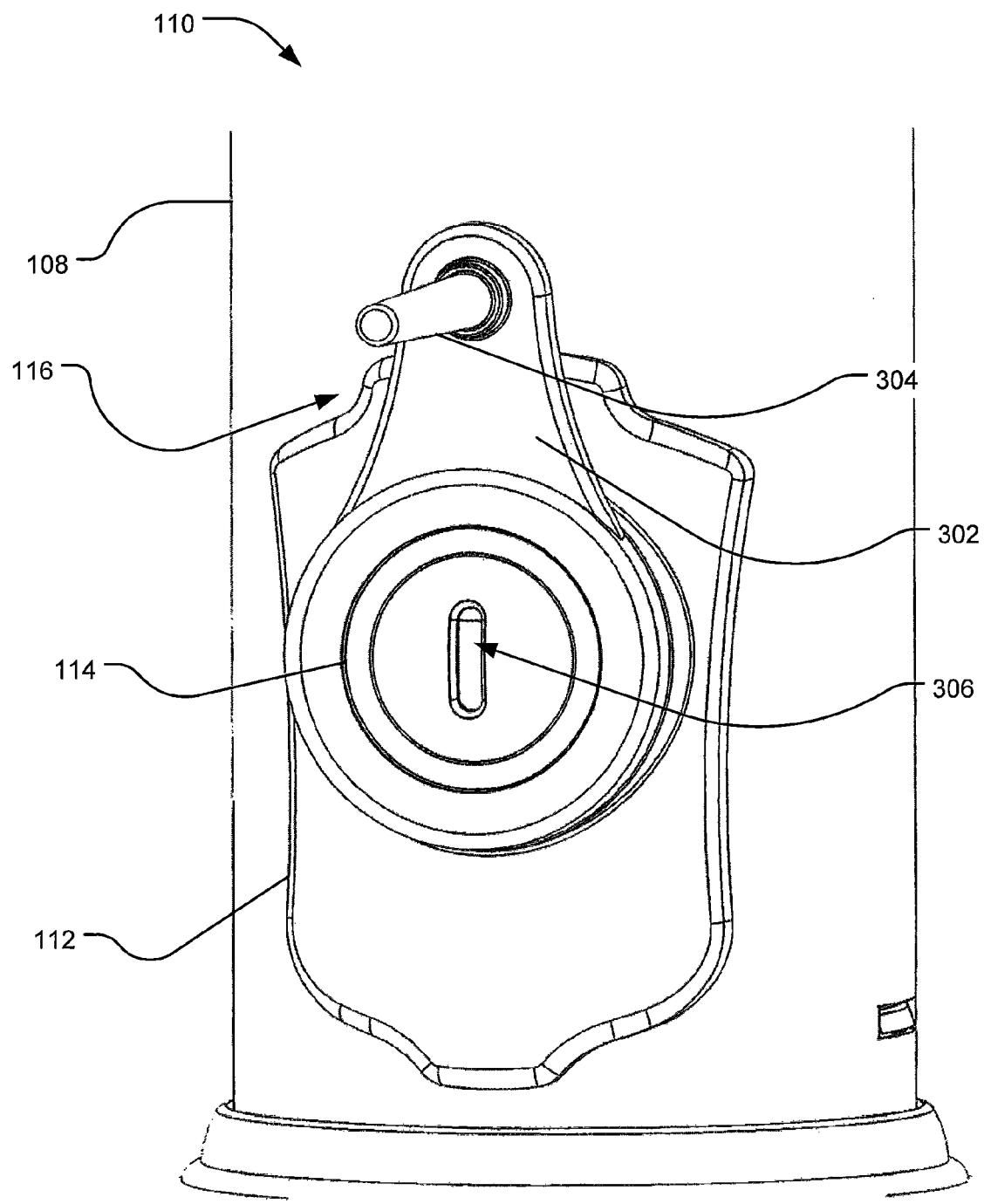
FIG. 3 illustrates an example feeding station having a rotational perch.

As shown in FIG. 3, the feeding station 110 is removably mounted on the wall 108. In one implementation, the feeding station 110 includes the port 112 and the perch 116, as described herein. The perch 116 includes a surface 302 and a projecting portion 304 that extends from the surface 302. The surface 302 may be a variety of shapes or designs. The surface 302 may further include additional planar, contoured angled, textured surfaces. The projecting portion 304 may extend in a variety of manners, including, but not limited to, linear, angled, contoured, or the like. The port 112 is configured to attach the perch 116 to the wall 108 relative to an opening through which bird food may be accessed. Once the perch 116 is attached to the wall 108, the projecting portion 304 extends generally outwardly from the wall 108.

In one implementation, the feeding station further includes the port plug 114. The port 112 may be configured to receive the port plug 114. As described with respect to FIG. 7, the perch 116 may be disposed between the port 112 and the port plug 114, thereby attaching the perch 116 to the port 112. In another implementation, the port 112 is adapted to receive and engage the perch 116 directly.

The port plug 114 includes at least one access opening 306 sized to permit limited access to bird food held in the reservoir 102. For example, the bird food held in the reservoir 102 may be thistle seed, so the access opening 306 may be sized to permit limited access to thistle seed. In one implementation, the access opening 306 is approximately 9.6 mm tall and approximately 2.3 mm wide. However, other dimensions of the access opening 306 are contemplated depending, for example, on the size of the bird food held in the reservoir 102. In one implementation, the port plug 114 is positioned near the approximate center of the port plug 114 and/or the port 112. A plurality of access openings similar to the access opening 306 may be present on the port plug 114 or elsewhere on the feeding station 110 to permit a bird to access the bird food in the reservoir.

The perch 116 may be attached to the port 112, such that the perch 116 may be rotated or otherwise moved relative to the port 112. In one implementation, as the perch 115 is moved between a plurality of positions, the projecting portion 304 of the perch 116 is located at a constant distance relative to the access opening 306. For example, the projecting portion 304 may be consistently located approximately 34 mm away from the access opening 306.

Figure 4:
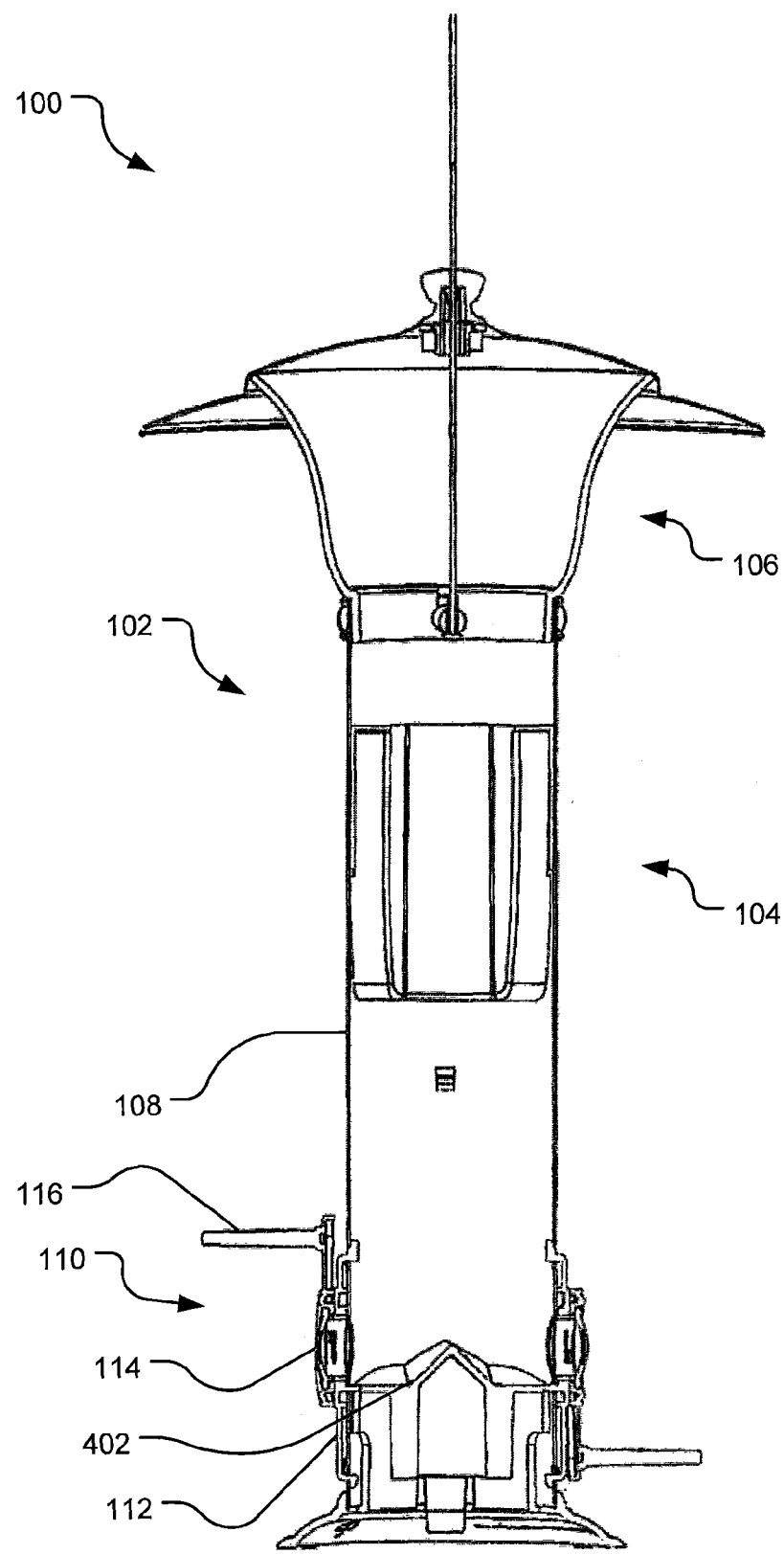
FIG. 4 illustrates a cross sectional view of the example bird feeder shown in FIG. 2.

As can be understood from FIG. 4, which is a cross sectional view of the bird feeder 100, the reservoir 102 may include one or more receiving portions for collecting bird food in the reservoir 102 and allocating the bird food to the one or more feeding stations. For example, a receiving portion 402 includes one or more angled and/or contoured surfaces to direct bird food to the feeding station 110. In some implementations, the receiving portions are configured to allocate bird food deposited in the reservoir 102 evenly to each of the feeding stations included in the bird feeder 100.

Figure 5:
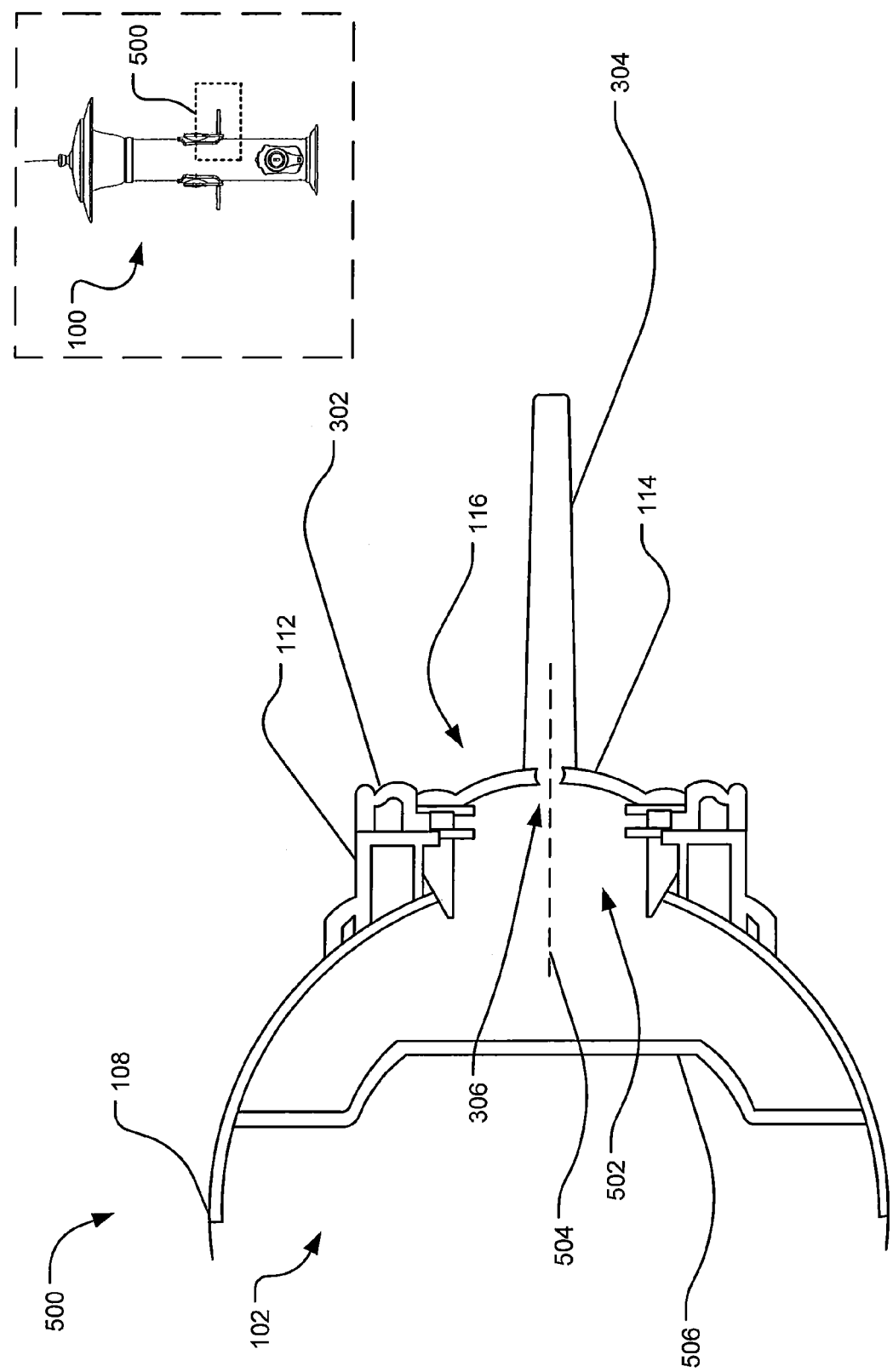
FIG. 5 illustrates a top cross sectional view of an example feeding station having a rotational perch.
Figure 6:
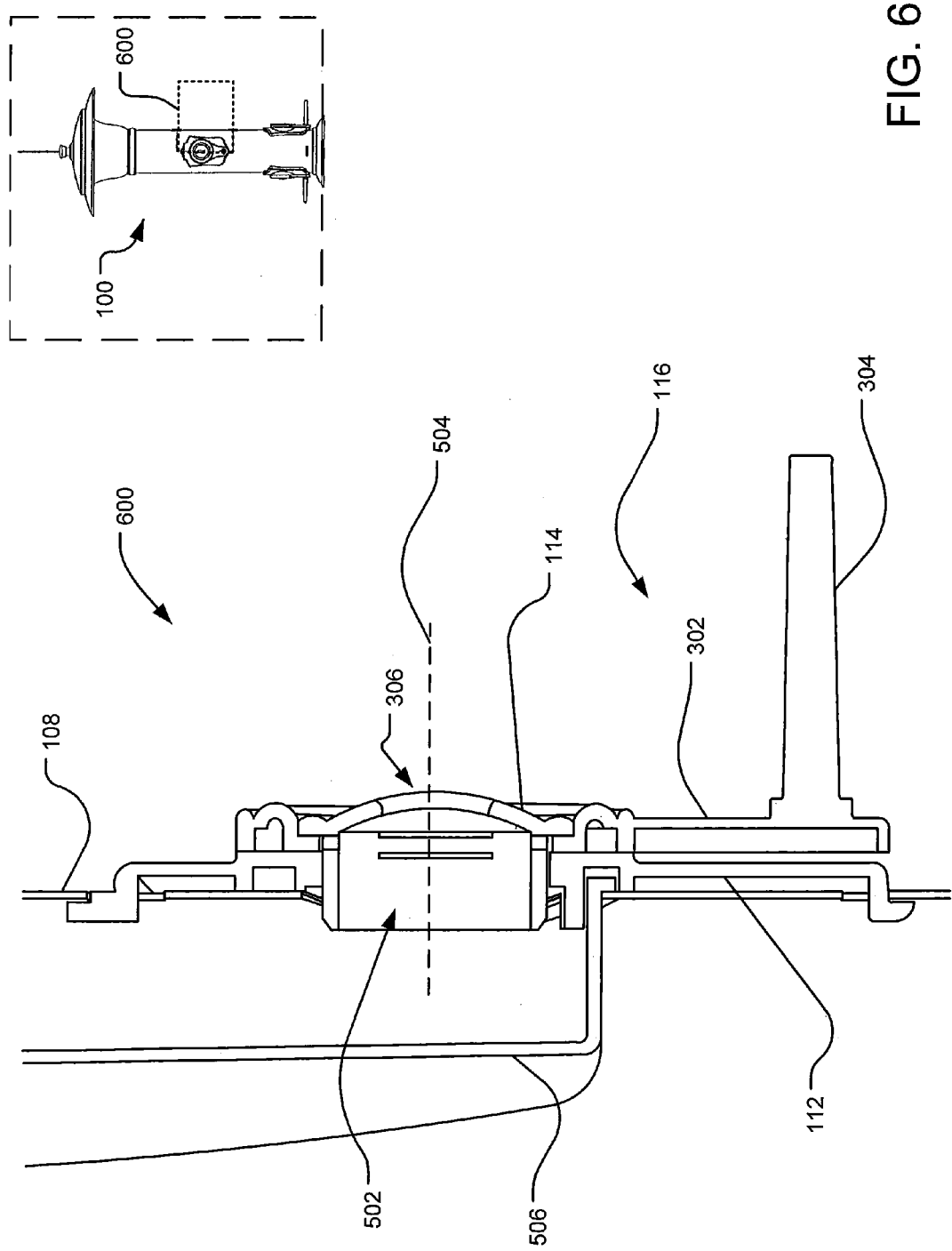
FIG. 6 illustrates a side cross sectional view of an example feeding station having a rotational perch.

FIGS. 5 and 6 show a top cross sectional view 500 and a side cross sectional view 600, respectively, of a feeding station on the bird feeder 100. As described herein, each feeding station may be mounted on the wall 108 relative to an opening 502 in the wall 108 through which the interior of the reservoir 102 may be accessed. The port 112 is mounted on the wall 108 such that the opening 502 is generally not obstructed.

In one implementation, the perch 116 is connected to the port 112 using the port plug 114. Specifically, the port plug 114 snaps into the port 112, thereby piercing the wall 108 and retaining the perch 116. In another implementation, the perch 116 snaps into the port 112 or the wall 108, such that the perch 116 may move (e.g., rotate) within a channel in the port 112 or the wall 108.

The surface 302 and the projecting portion 304 of the perch 116 may be rotated about an axis line 504. In one implementation, the axis line 504 lies at an approximate center of the port plug 114, near the access opening 306, an approximate center of the port 112, and/or an approximate center of the opening 502 in the wall 108. As described with respect to FIGS. 7A-C, in one implementation, the port 112 and the port plug 114 remain stationary as the perch 116 is rotated. In another implementation, the port plug 114 and/or the port 112 rotate as the perch 116 rotates.

Further, as described with respect to FIG. 4, the reservoir 102 may include a receiving portion 506 for collecting and allocating bird food to the access opening 306. As shown in FIGS. 5 and 6, the receiving portion 506 may be a substantially thin wall having one or more surfaces for directing bird food to the access opening 306.

Figure 7A:
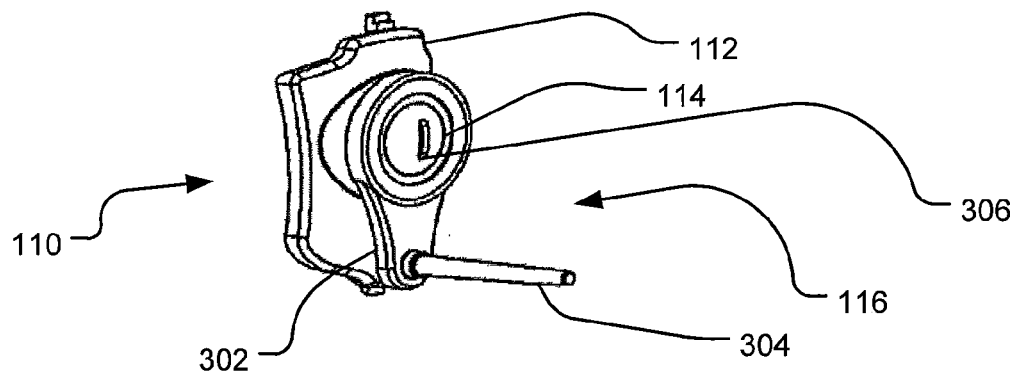
FIGS. 7A-C illustrate three perspective views of an example feeding station showing a perch rotated to various positions.
Figure 7B:
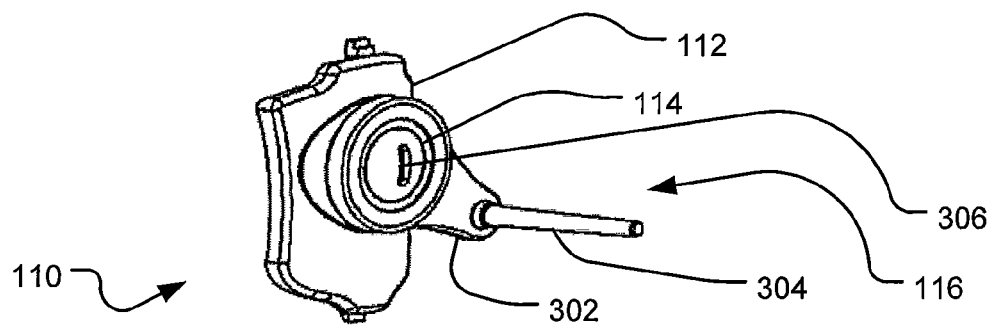
Figure 7C:
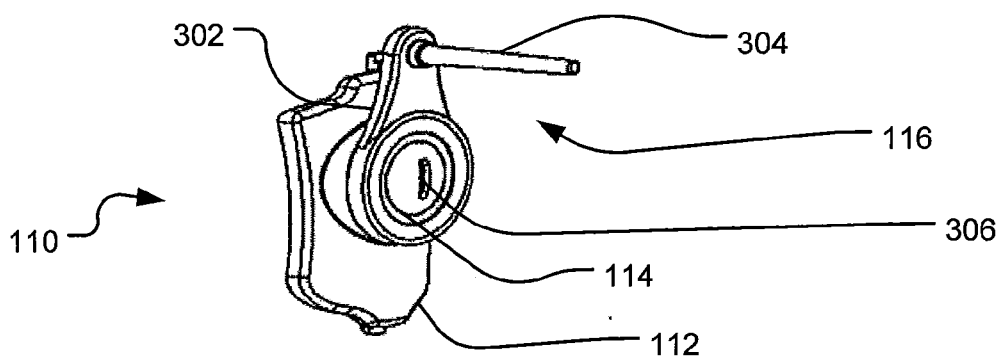

FIGS. 7A-C illustrate three perspective views of the feeding station 110 showing the perch 116 rotated to a plurality of positions about the port 112. FIG. 7A shows the perch 116 rotated such that the surface 302 and the projecting portion 304 are positioned near the bottom of the port 112 and below the access opening 306 on the port plug 114. The position shown in FIG. 7A may be used to attract house finches, other birds, and the goldfinch. FIG. 7B shows the perch 116 as it is rotated counterclockwise towards the top of the port 112. During the rotation, the surface 302 and the projecting portion 304 are positioned at an angle relative to the access opening 306 on the port plug 114. Finally, FIG. 7C shows the perch 116 rotated such that the surface 302 and the projecting portion 304 are positioned near the top of the port 112 and above the access opening 306 on the port plug 114. The position shown in FIG. 7C may be used to attract goldfinches and exclude house finches and other birds. As can be understood from FIGS. 7A-7C, in one implementation, as the perch 116 is rotated, the port 112, the port plug 114, and the access opening 306 remain stationary and are generally not affected by the rotation of the perch 116.

Figure 7D:
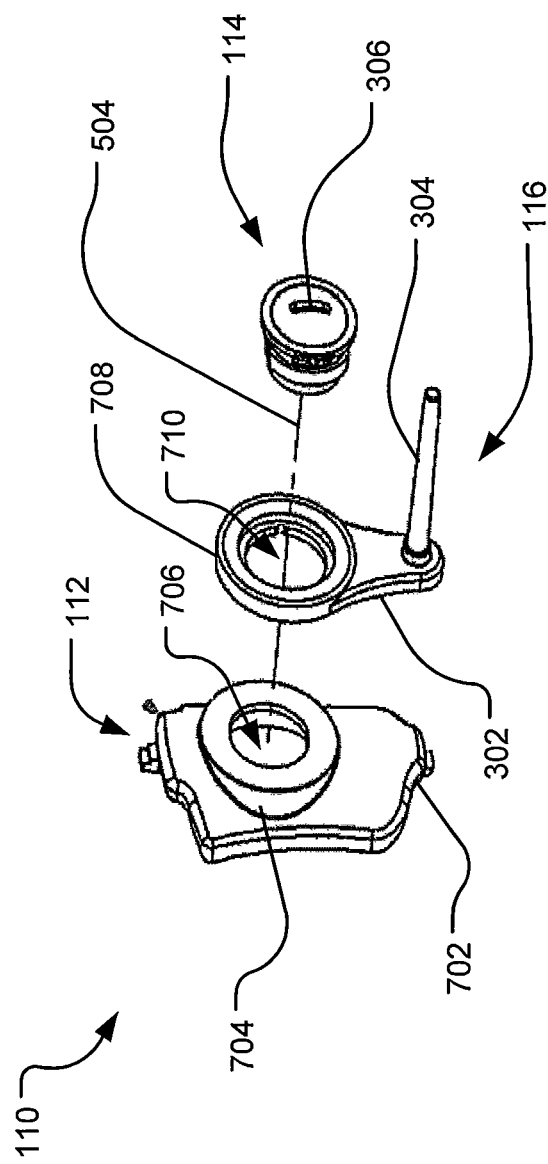
FIG. 7D illustrates an exploded view of the example feeding station.

FIG. 7D illustrates an exploded view of the feeding station 110, which includes the port 112, the perch 116, and the port plug 114. In one implementation, the port 112 includes a surface 702 and a protruding portion 704 extending from the surface 702. The protruding portion 704 defines an opening 706 configured to provide access to the opening 502 in the wall 108. The surface 702 may be shaped to mirror the shape of the wall 108 such that the surface 702 fits snugly against the wall 108 once mounted. The protruding portion 704 has a generally circular shape adapted to provide a planar surface to receive the perch 116. It will be understood by those of ordinary skill in the art that the protruding portion 704 may have a variety of shapes, including, but not limited to, rectangular, elliptical, triangular, and polygonal, and the surface 702 may have a variety of shapes, including shapes that do not mirror the shape of the wall 108.

In one implementation, the perch 116 includes a ring 708 defining an opening 710. The ring 708 is sized relative to the protruding portion 704. For example, the ring 708 may be the same size as the protruding portion 704 such that when the protruding portion 704 is connected to the ring 708, the openings 706 and 710 create substantially one opening. However, in other implementations, the ring 708 is larger or smaller in size compared to the protruding portion 704. In another implementation, the surface 302 extends over the ring 708 to substantially cover the opening 706 of the port 112 when the perch 116 engages the protruding portion 704 of the port 112. The surface 302 may be a variety of shapes and/or designs. The surface 302 may include one or more access openings (e.g., similar to the access opening 306) to provide access to the opening 706. The ring 708 of the perch 116 may engage the protruding portion 704 of the port 112 such that the perch 116 may be moved to a plurality of positions around the opening 706 of the port 112.

In one implementation, the protruding portion 704 is configured to receive the port plug 114 such that the perch 116 is disposed between the port 112 and the port plug 114. The general center of the opening 706 of the port 112 may be positioned near or along the axis 504. The general center of the opening 710 and/or of the surface 302 of the perch 116 may be positioned near or along the axis 504. In one implementation, the axis 504 corresponds to the access opening 306 on the port plug 114. The access opening 306 provides the bird access to the bird food in the reservoir 102 via the openings 706 and 710.

FIGS. 8A and 8B illustrate a side view and a front view, respectively, of the feeding station 110. In one implementation, the feeding station 110 includes the port 112 and the perch 116 configured to be mounted on the wall 108 of the reservoir 102 relative to an opening in the wall 108 that permits a bird to access bird food held in the reservoir 102. The perch includes a surface 302 from which a projecting portion 304 extends. In one implementation, the port plug 114 attaches the perch 116 to the port 112 such that the projecting portion 304 may be moved to various positions relative to the access opening 306, as described herein. In another implementation, the perch 116 is attached to the port 112 and/or the wall 108 directly such that the projecting portion 304 may be moved to various positions relative to the opening 502 in the wall 108, as described herein.

Figure 9:
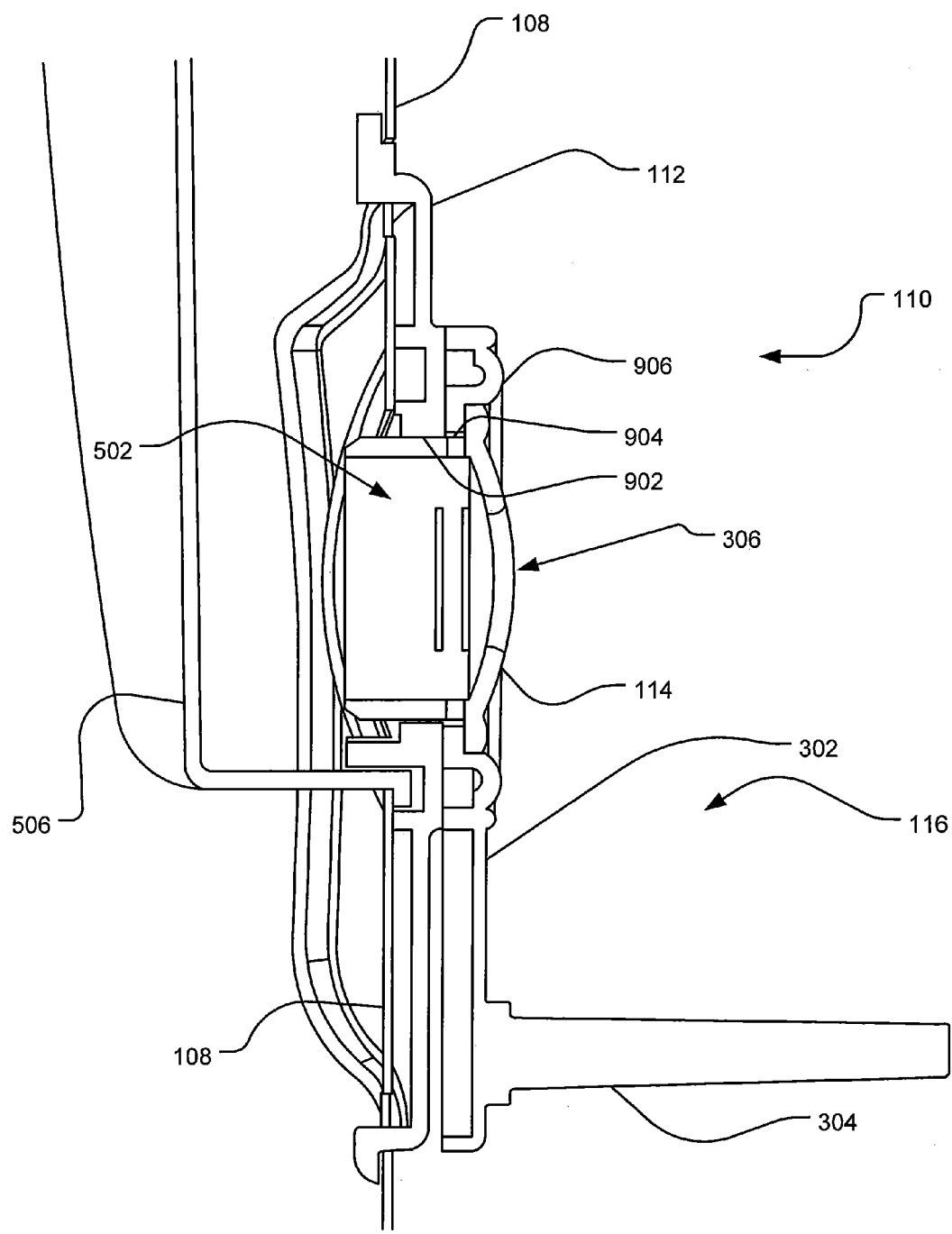
FIG. 9 illustrates another side cross sectional view of an example feeding station having a rotational perch.

As shown in FIG. 9, which is a side cross sectional view, the feeding station 110 is mounted on the wall 108 relative to the opening 502 through which the interior of the reservoir 102 may be accessed. The port 112 is mounted on the wall 108 such that the opening 502 is not obstructed. In one implementation, the perch 116 is connected to the port 112 using the port plug 114. Specifically, the port 112 includes a substantially flat portion 902 configured to engage a channel 904 of the flat portion 902. As described with respect to FIGS. 10-12, a barbed portion 906 is disposed between a portion of the port 112 and a portion of the port plug 114 such that the perch 116 is rotationally mounted to the wall 108. The surface 302 and the projecting portion 304 may then be rotated relative to the access opening 306. In one implementation, the port 112 and the port plug 114 remain in the same position as the perch 116 is rotated. Further as described with respect to FIGS. 4 and 5, the reservoir 102 may include a receiving portion 506 for collecting and allocating bird food to the access opening 306.

Figure 10:
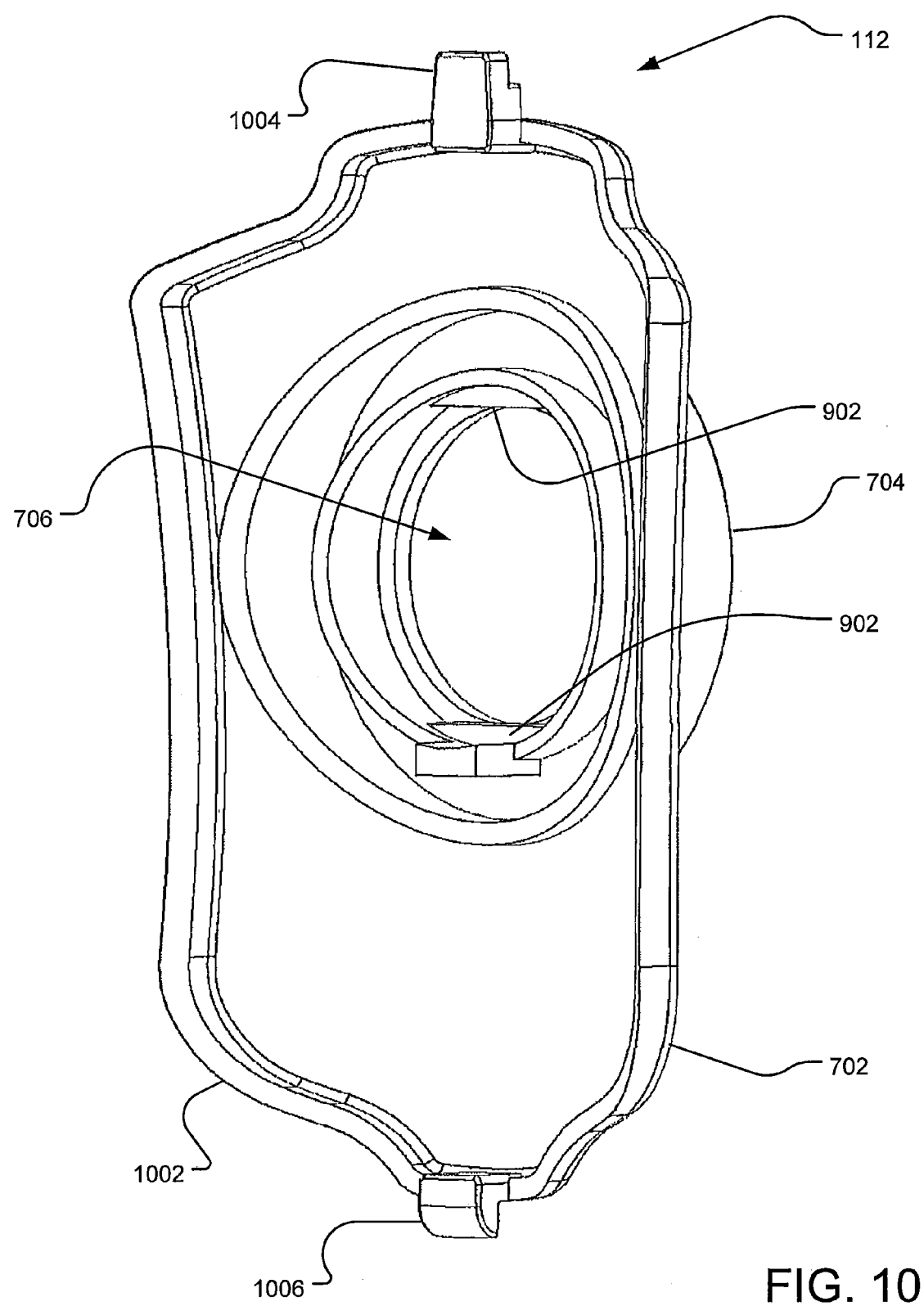
FIG. 10 illustrates a back perspective view of an example port.
Figure 11:
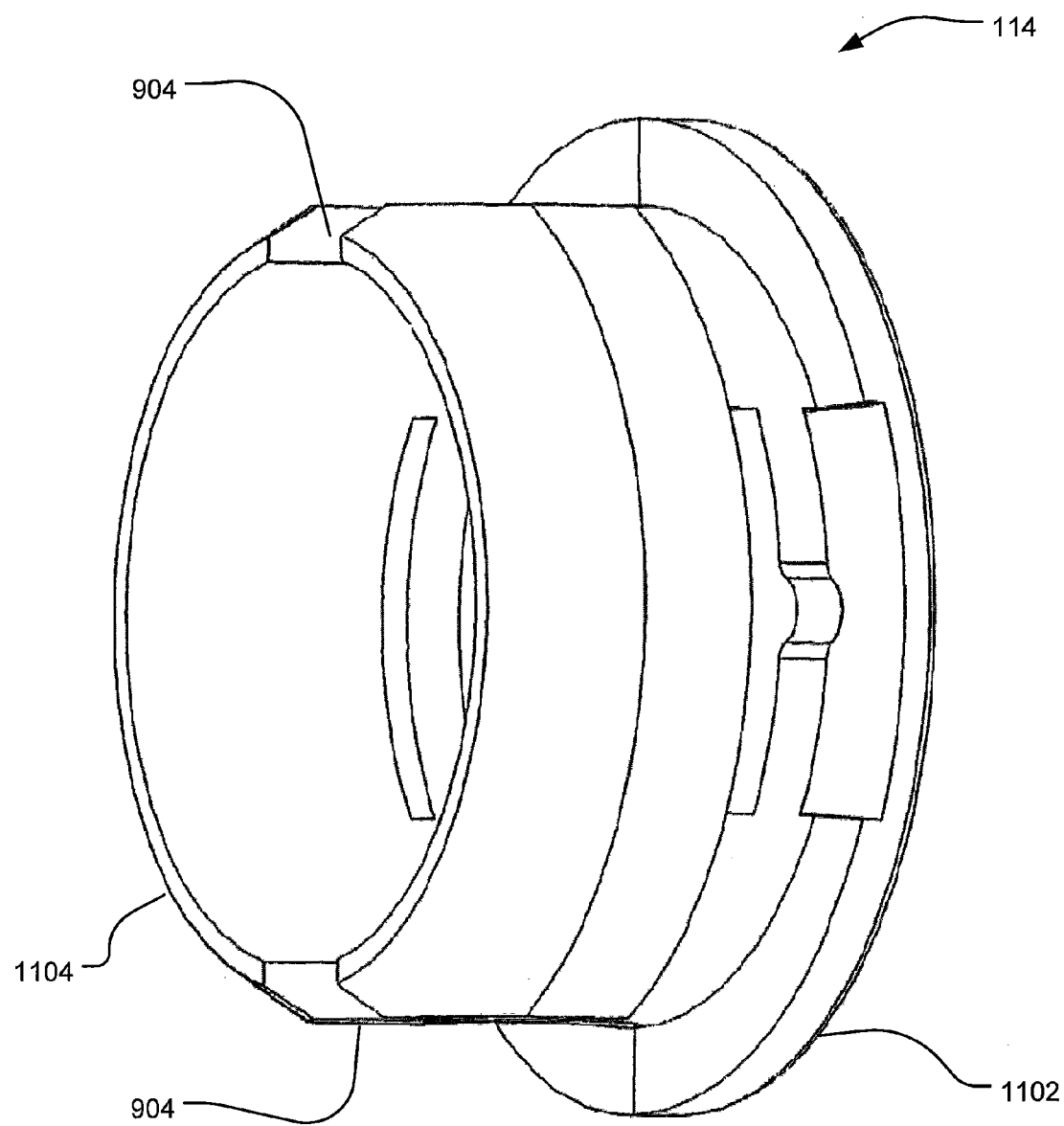
FIG. 11 illustrates a back perspective view of an example port plug.
Figure 12:
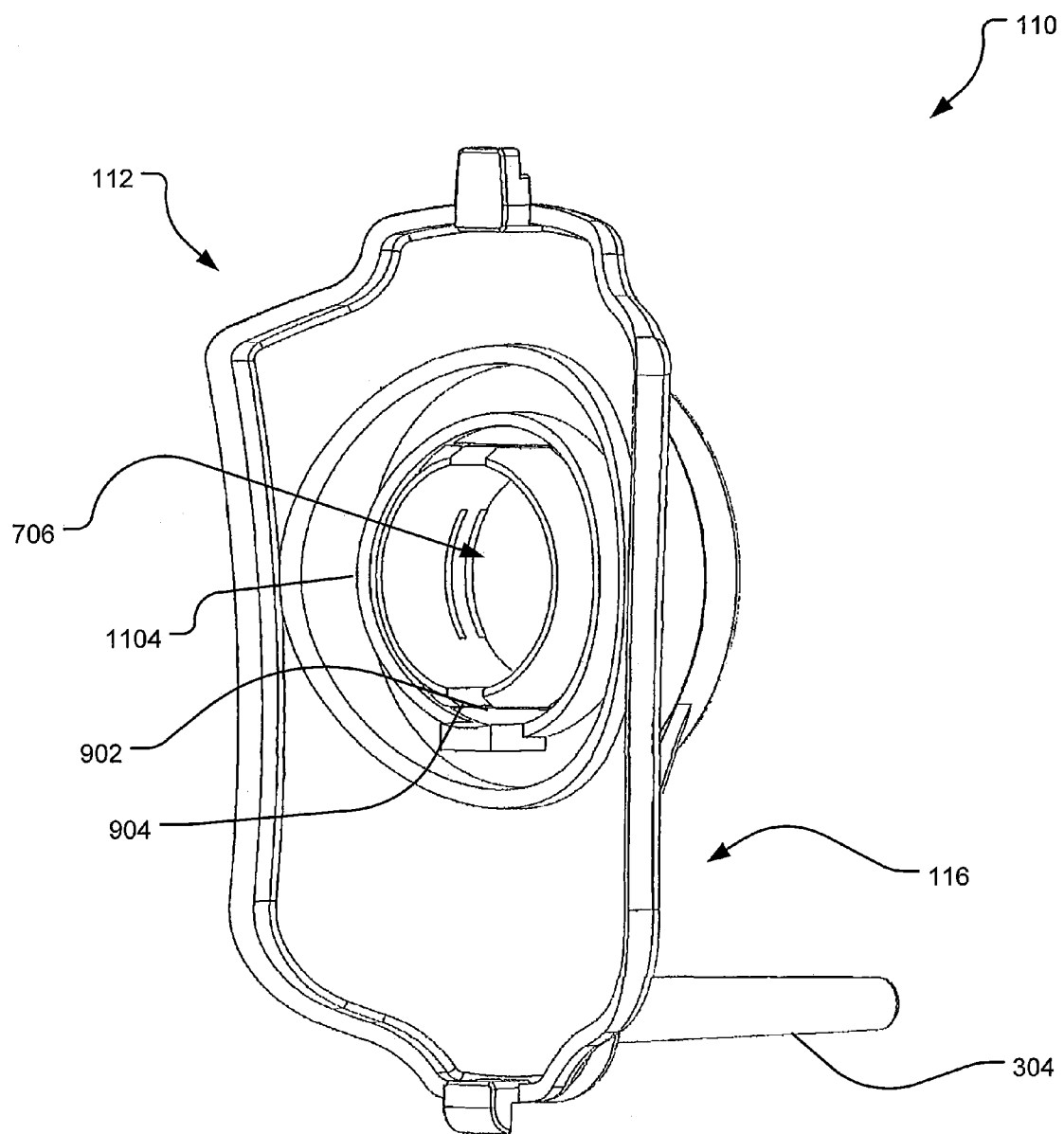
FIG. 12 illustrates a back perspective view of an example feeding station having a rotational perch.

FIGS. 10-12 illustrate back perspective views of various components of the feeder 110. In FIG. 10, the port 112 is shown, which includes the protruding portion 704 extending from the surface 702 to define the opening 706. In one implementation, the protruding portion 704 further includes the substantially flat portions 902 configured to engage the port plug 114. In one implementation, the surface 702 has a lip 1002, a first mounting portion 1004, and a second mounting portion 1106 each configured to engage a portion of the wall 108. For example, the lip 1002 extends from the surface 702 to provide a snug fit against the wall 108 along the length of the lip 1002. Further, the mounting portions 1004 and 1006 are configured to engage the reservoir 102 through an opening in the wall 108.

As can be understood from FIGS. 11 and 12, the port 112 may be configured to engage the port plug 114. In one implementation, the port plug 114 includes a tube 1104 and a lip 1102. The tube 1104 is inserted into the opening 706 such that the channels 904 to engage the flat portions 902 of the port 112. The port plug 114 may be inserted into the opening 706 until the barbed portion 906 of the perch 116 is engaged by both the lip 1104 and the port 112, thereby rotationally attaching the perch 116 to the port 112.

Based upon design preferences, it is understood that the specific order or hierarchy of steps in the method can be rearranged while remaining within the disclosed subject matter. The accompanying method claims present elements of the various steps in a sample order and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

The above specification, examples, and data provide a complete description of the structure and use of example implementations of the invention. Various modifications and additions can be made to the exemplary implementations discussed without departing from the spirit and scope of the presently disclosed technology. For example, while the implementations described above refer to particular features, the scope of this disclosure also includes implementations having different combinations of features and implementations that do not include all of the described features. Accordingly, the scope of the presently disclosed technology is intended to embrace all such alternatives, modifications, and variations together with all equivalents thereof.

What is claimed is:

1. A bird feeder comprising:
   a ring defining an opening;
   a surface extending over the ring and covering the opening, the surface having one or more holes positioned over the opening; and
   a projecting portion extending from the surface, the ring configured to engage a wall on a reservoir, such that the projecting portion is moveable to a plurality of positions relative to an axis line extending through a center of the opening.

2. The bird feeder of claim 1, wherein the projecting portion is curved.

3. The bird feeder of claim 1, wherein the surface includes ornamental features.

4. The bird feeder of claim 1, wherein the ring is configured to engage the wall using a port.

5. The bird feeder of claim 4, wherein the port is snapped into the wall.

6. The bird feeder of claim 4, wherein the ring is snapped into the port.

7. The bird feeder of claim 1, wherein the projecting portion is moveable to the plurality of positions by rotating the projecting portion about the axis line.

8. The bird feeder of claim 1, wherein the projecting portion is moveable to the plurality of positions by sliding the projecting portion along a line intersecting the axis line.

9. The bird feeder of claim 1, wherein the plurality of positions include above and below the axis line.

10. A bird feeder comprising:
    a ring defining an opening; and
    a projecting portion extending from the ring, the ring configured to be mounted a wall of a reservoir, such that an end of the projecting portion is moveable to a plurality of positions relative to an axis line extending through a center of the opening.

11. The bird feeder of claim 10, wherein the projecting portion is curved.

12. The bird feeder of claim 10, wherein the end of the projecting portion is moveable to the plurality of positions by rotating the projecting portion about the axis line.

13. The bird feeder of claim 10, wherein the plurality of positions include above and below the axis line.

14. A bird feeder comprising:
    a ring defining an opening, the ring configured to be rotationally mounted on a wall of a reservoir; and
    a projecting portion extending from the ring to an end, the projecting portion configured to rotate about an axis line extending through the opening between a first position and a second position, the first position including the end of the projecting portion above the opening and the second position including the end of the projecting portion below the opening.

15. The bird feeder of claim 14, wherein the projecting portion is curved.

* * * * *